(12) United States Patent
Kwak et al.

(10) Patent No.: US 9,451,395 B2
(45) Date of Patent: Sep. 20, 2016

(54) METHOD AND APPARATUS FOR MEASURING A POSITION IN A WIRELESS ACCESS SYSTEM

(75) Inventors: Jeong Ho Kwak, Daejeon (KR); Byoung Hoon Kim, Anyang-si (KR); Jeonghoon Mo, Seoul (KR); Ji Hwan Kim, Daejeon (KR); Jae Won Lim, Anyang-si (KR); Song Chong, Daejeon (KR)

(73) Assignees: LG ELECTRONICS INC., Seoul (KR); INDUSTRY-ACADEMIC COOPERATION FOUNDATION, YONSEI U, Seoul (KR)

( * ) Notice: Subject to any disclaimer, the term of this patent is extended or adjusted under 35 U.S.C. 154(b) by 143 days.

(21) Appl. No.: 14/344,275

(22) PCT Filed: Dec. 14, 2011

(86) PCT No.: PCT/KR2011/009612
§ 371 (c)(1),
(2), (4) Date: Mar. 11, 2014

(87) PCT Pub. No.: WO2013/042828
PCT Pub. Date: Mar. 28, 2013

(65) Prior Publication Data
US 2014/0342750 A1    Nov. 20, 2014

Related U.S. Application Data

(60) Provisional application No. 61/536,541, filed on Sep. 19, 2011.

(51) Int. Cl.
*H04W 4/02* (2009.01)
*G01S 5/02* (2010.01)
*H04W 64/00* (2009.01)

(52) U.S. Cl.
CPC ............. *H04W 4/02* (2013.01); *G01S 5/02* (2013.01); *G01S 5/0205* (2013.01); *H04W 64/003* (2013.01)

(58) Field of Classification Search
CPC .... H04W 4/02; G01S 1/042; H04L 63/0414; H04L 45/02
See application file for complete search history.

(56) References Cited

U.S. PATENT DOCUMENTS

2003/0117966 A1* 6/2003 Chen ................. H04L 45/02
370/255

(Continued)

FOREIGN PATENT DOCUMENTS

| KR | 10-2007-0117429 | 12/2007 |
|---|---|---|
| KR | 10-2011-0027925 | 3/2011 |

*Primary Examiner* — Myron K Wyche
(74) *Attorney, Agent, or Firm* — Lee Hong Degerman Kang & Waimey; Jonathan Kang; Jeffrey Lotspeich

(57) ABSTRACT

The present invention relates to a method in which a first station receives position information using a second station positioned in the vicinity of the first station. The method includes the steps of: receiving a station identifier (STID) and at least one fake identifier (ID) from a base station; obtaining a fake ID of the second station; requesting position information on the second station from the base station using the fake ID of the obtained second station; and receiving the position information on the second station of the base station, wherein the fake ID is an identifier used for position measurement and is mapped to the STID.

12 Claims, 7 Drawing Sheets

(56) References Cited

U.S. PATENT DOCUMENTS

2004/0214584 A1 10/2004 Marinier
2007/0286212 A1* 12/2007 Kim .................... H04L 63/0414
  370/398
2012/0249372 A1* 10/2012 Jovicic .................... G01S 1/042
  342/451

* cited by examiner

METHOD AND APPARATUS FOR MEASURING A POSITION IN A WIRELESS ACCESS SYSTEM

CROSS-REFERENCE TO RELATED APPLICATIONS

This application is the National Stage filing under 35 U.S.C. 371 of International Application No. PCT/KR2011/009612, filed on Dec. 14, 2011, which claims the benefit of U.S. Provisional Application Ser. No. 61/536,541, filed on Sep. 19, 2011, the contents of which are hereby incorporated by reference herein in their entirety.

BACKGROUND OF THE INVENTION

1. Field of the Invention

The present specification relates to a method and an apparatus for measuring a position, more particularly, to a method and an apparatus for measuring a position by cooperation.

2. Related Art

The localization has been largely researched in order to provide the location based service (LBS) of a mobile station as recently the smart phones get spread widely. Also, for performing the Beam Forming by making use of Directional antenna, the base station is able to increase the network capacity through the space diversity and interference management by regulating the direction and the power with the reference of the position of the mobile station, in case that the base station acknowledges the location of the mobile station.

However, the biggest problem in the present localization of the mobile station is that the power consumption of the mobile station is large. In order to perform the localization to the accuracy required by the mobile station and the network, it is necessary to utilize GPS, but GPS consumes large power. As an example, in case a mobile station performs the GPS localization continuously over 3 hours, the power of a mobile station is exhausted.

Accordingly, a method of localization which is not using GPS but effective in power has been largely researched. The following four methods are the examples.

1. A Method for Measuring the Position Using Physical Tools

This is a method, when a mobile station uses a cellular network or a wireless LAN, the mobile station receives a cellular signal or a wireless LAN signal form a base station or an AP of the wireless LAN and then roughly detects the position of the mobile station using intensity of the signal.

For this method, it is more effective in the aspect of power consumption than the localization utilizing GPS, but the error range is very large as much as 100 to 3000 m. Accordingly, a method such as an advanced forward link trilateration (AFLT) is suggested to decrease the error range of the method described above, the AFLT is a method for measuring location using the triangulation method by receiving signal from at least three base stations which are near to a mobile station or an AP of the wireless LAN. However, the AFLT also has a drawback in that the error range is still large as much as 50 to 200 m since the cellular signal or the wireless LAN signal are both multiple path signals.

2. A Method for Measuring the Position Using Indirect Tools

This is a method for measuring the position of a mobile station indirectly by utilizing several sensors built-in the mobile station. The sensors for measuring the position are such as an accelerometer, a digital compass, an angle meter, and so on. However, this method has drawbacks in those an additional sensor is required by the station and the accuracy of measuring the position is not so good.

3. A Method for Measuring the Position by Optimizing GPS/WiFi/Cell ID

This is a method which can use different localization methods according to the location of a mobile station. For example, if a mobile station is outdoors where is good to receive the GPS signals, it is effective to utilize the GPS.

However, if a mobile station is indoors, it is unable to measure the accurate position by using GPS. Rather, in this case, it results in additional power consumption to receive the GPS signal. In addition, if situation is not good to receive the GPS signal (if the accuracy is not good), the power consumption may be decreased by increasing the period to measure GPS. Accordingly, it is the optimal way of selecting a method of the position measurement (by using GPS or WiFi or cell ID) which is fit to the conditions of the mobile terminal according to its circumstances.

4. A Method for Measuring the Position Utilizing Sociality

This is a method in which localization indoors is possible by utilizing human mobility, when a person meets another person, by exchanging information stored in each mobile station, which is traced up to now. However, since the method utilizing the sociality presupposes several limited conditions and several assumptions, still further research is necessary in application of the localization technology in real surroundings.

SUMMARY OF THE INVENTION

A mobile station consumes lots of energy when it measures position of other mobile station utilizing GPS (or High accuracy localization technology). Considering the human mobility that people live around other people nearly all the times, if measuring the position of only one person and sharing the position information with others around rather than utilizing GPS to measure the position of mobile stations of all people gathered, lots of energy can be saved for all the mobile stations.

However, the ID of the corresponding mobile station is required in order for a user to utilize the GPS information of the neighboring mobile since the user should acknowledge the GPS information of which mobile station may be used. That is, in order to share the position information measured by a specific mobile station, the ID of the specific mobile station should be shared with others nearby. However, in case of sharing the ID of a specific mobile station with neighboring mobile stations, a problem of intervening Privacy may occur.

Accordingly, in order to solve the problem described above, an object of the present specification is to provide a method for measuring position through cooperation by transmitting a fake ID which is used for measuring position to mobile stations by a base station.

In addition, an object of the present specification is to provide a method for determining a Cluster Header (CH) that directly measures position.

Further, an object of the present specification is to provide a method for reallocating a fake ID which is allocated to each of the mobile stations.

According to an aspect of the present invention, a method for receiving position information performed by a first station using a second station positioned in the vicinity of the first station in a wireless access system is provided. The method comprises receiving a station identifier (STID) and at least one fake ID from a base station; obtaining a fake ID of the second station; requesting the position information on the second station to the base station using the obtained fake ID of the second station; and receiving the position information of the second station from the base station, wherein the fake ID is an identifier used for measuring the position, and is mapped to the STID.

The obtaining the fake ID of the second station comprises: overhearing a transmission signal of the at least one of the second stations; measuring an intensity of the transmission signal overheard; and selecting a transmission signal whose intensity measured is the biggest among the second stations.

The signal transmitted by at least one of the second station is a fake ID.

The method further comprises measuring the position information utilizing GPS performed by the second station; and transmitting the position information to the base station, which is measured by the second station using the fake ID allocated from the base station.

The measuring the position information utilizing GPS performed by the second station comprises: calculating a cost performed by each of the stations which belong to at least one of the clusters; exchanging the cost one another, which is calculated by each of the stations using a Bluetooth communication; determining a cluster head (CH) by each of the stations based on the cost exchanged among the stations; exchanging the CH one another, which is determined by each of the stations, which is performed by each of the stations; and if the CHs exchanged among the stations are identical, determining the identical CH to be a station to measure position using the GPS.

The cost is calculated by the following equation, $$C_i(t) = d_i(t) \frac{w_i T_i(t)}{E_{r,i}(t)}, \text{ where } d_i(t) = \frac{1}{\sum_{j \neq i} RSSI_{ji}(t)^\alpha}$$

The method further comprises receiving control information that represents effective use time of the fake ID which is allocated to each of the stations in order to measure the position from the base station.

The method further comprises if the effective use time is terminated, receiving reallocation of a fake ID from the base station.

According to an aspect of the present invention, method for measuring position through cooperation between a first station and a second station positioned in the vicinity of the first station in a wireless access system is provided. The method comprises transmitting a station identifier (STID) and at least one fake ID to the first station and the second station performed by a base station; receiving position information of the first station from the first station through the fake ID allocated to the first station performed by the base station; receiving a message of requesting the position information of the first station from the second station through the fake ID allocated to the first station performed by the base station; and transmitting the position information of the first station to the second station performed by the base station.

The fake ID is an identifier used for measuring position, and is mapped to the STID.

The method further comprises extracting the position information of the first station from the fake ID allocated to the first station transmitted through the second station using a mapping table previously stored, which is performed by the base station.

According to yet another aspect of the present specification, a station to measure position information using neighboring station in a wireless access system is provided. The station comprises a radio frequency (RF) part to transmit or receive a wireless communication signal, and a processor connected to the RF part, wherein the processor is configured to perform of: controlling the RF part in order to obtain a fake ID of the neighboring station, controlling to request the position information of the neighboring station to a base station using the fake ID obtained, and controlling to receive the position information of the neighboring station from the base station, wherein the fake ID is an identifier used for measuring position, wherein the fake ID is allocated to each of the stations by at least one performed by the station, and wherein the fake ID is mapped to a station identifier (STID).

The processor controls the RF part to receive control information that represents a use time of the fake ID which is allocated to each of the mobile stations performed by the base station.

According to the present specification, it is able to measure the position of a mobile station with the error range which is as much as a bit of error is added to the error range of the GPS position measurement.

In addition, according to the present specification, it suggests power effectiveness in localization which is used for the LBS application. Also, while it is necessary to increase network capacity to withstand the abrupt growth in network traffic, by performing position measurement with effectiveness in power by a mobile station, a base station use it for Beam Forming to a mobile station. Further, since it is able to use the power of a base station effectively, it is helpful for Greening of a cellular network, and consequently, it dramatically decreases inter-cell interferences.

DESCRIPTION OF EXEMPLARY EMBODIMENTS

Figure 1:
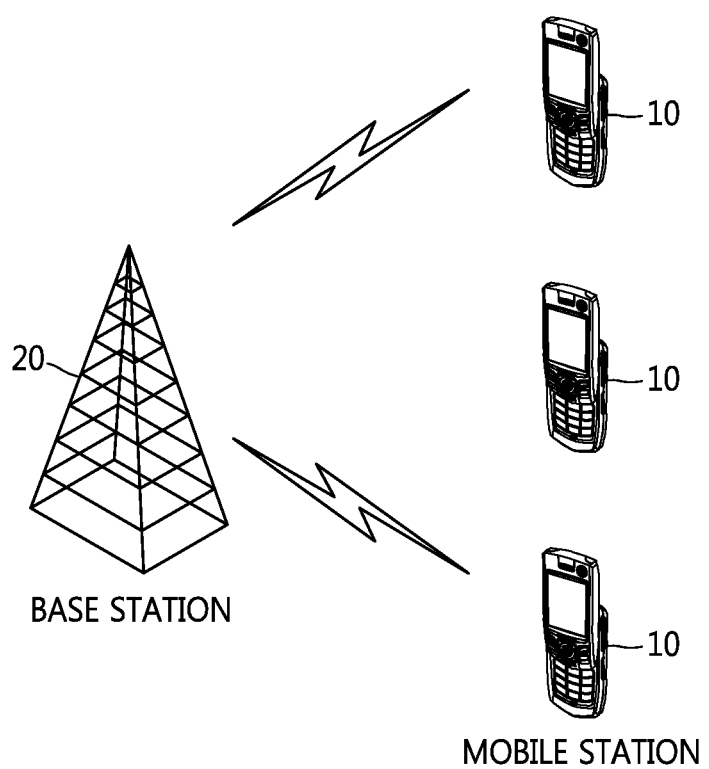
FIG. 1 is schematic view showing a wireless communication system which is applicable to an embodiment shown in the present specification.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e.

Also, 802.16p provides the communication standard to support the machine type communication (MTC).

The UTRA is part of a universal mobile telecommunications system (UMTS). 3rd generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

The terminology used herein is for the purpose of describing particular embodiments only and is not intended to be limiting of the present invention. Unless otherwise defined, the technical terms used herein have the same meaning as commonly understood by one of ordinary skill in the art to which the present invention belongs, and will not be interpreted in overly comprehensive sense or overly restricted sense unless expressly so defined herein. Also, in case the technical terms used in this specification are wrong technical terms which can not represent the idea of the present invention, the terms should be understood as the replaced technical terms which can be understood by one of ordinary skill in the art. In addition, the common terms used in the present invention should be understood according to defined in dictionary, or should be interpreted as having a meaning that is consistent with their meaning in the context of the relevant art, and will not be interpreted in overly restricted sense.

As used herein, the singular forms are intended to include the plural forms as well, unless the context clearly indicates otherwise. It will be understood that the terms "comprise" or "include" etc. will not be interpreted to necessarily include all of the several elements or the several steps described in this specification, but some of the elements or the steps may not included, or may include additional elements or steps.

Although the terms first, second, etc. may be used herein to describe various elements, it will be understood that these elements should not be limited by these terms. These terms are only used to distinguish one element from another. For example, a first element could be termed a second element, and similarly, a second element could be termed a first element without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening element present.

The inventive subject matter now will be described more fully hereinafter with reference to the accompanying drawings, in which embodiments of the present invention are shown. The same or similar elements will be denoted by the same reference numerals regardless of the reference numeral, and the redundant description will be omitted. In addition, in describing the present invention, in case the detailed description for the related known art may confuse the subject matter, the description will be omitted. Also, the accompanying drawings are only intended for the inventive concept to be easily understood, which does not mean the scope of the present invention is not limited thereto. The present invention should be interpreted to be extended to modifications, equivalents and alternatives, which are included in the inventive concept and scope, and should not be construed as limited to the drawings set forth herein.

FIG. 1 is schematic view showing a wireless communication system which is applicable to an embodiment shown in the present specification. The wireless communication system is widely deployed to provide various communication services such as voice, packet data, and so on.

Referring to FIG. 1, the wireless communication system 10 includes a mobile station (MS) 10 and a base station (BS) 20. The MS 10 may be fixed or have mobility and may be called other names such as user equipment (UE), user terminal (UT), subscriber station (SS), wireless device, advanced mobile station (AMS). Also, the MS 10 includes the concept of MTC or M2M station.

The BS 20 generally refers to a fixed station that communicates with the MS 10 and may be called other names such as NodeB, base transceiver system (BTS), access point (AP), etc. More than one cell exists in one BS 20.

The wireless communication system may be the system based on the orthogonal frequency division multiplexing (OFDM)/orthogonal frequency division multiple access (OFDMA).

The OFDM uses multiple orthogonal subcarriers. The OFDM uses the orthogonality between the inverse fast Fourier transform (IFFT) and the fast Fourier transform (FFT). A transmitter transmits data by performing the IFFT. A receiver restores the original data by performing the FFT of the signal received. The transmitter uses the IFFT to combine multiple subcarriers, and the receiver uses the FFT to separate the multiple subcarriers.

Hereinafter, the method for measuring position using a fake ID, the method for determining a cluster header (CH) which is directly measuring position and the method for changing the fake ID allocated will be described in detail.

In addition, it is assumed that the first station mentioned below is the station that does not directly measure position but measure the position by cooperation, and the second station is the station that directly measures the position.

The First Embodiment

The first embodiment provides a method for measuring position using the fake ID.

Figure 2:
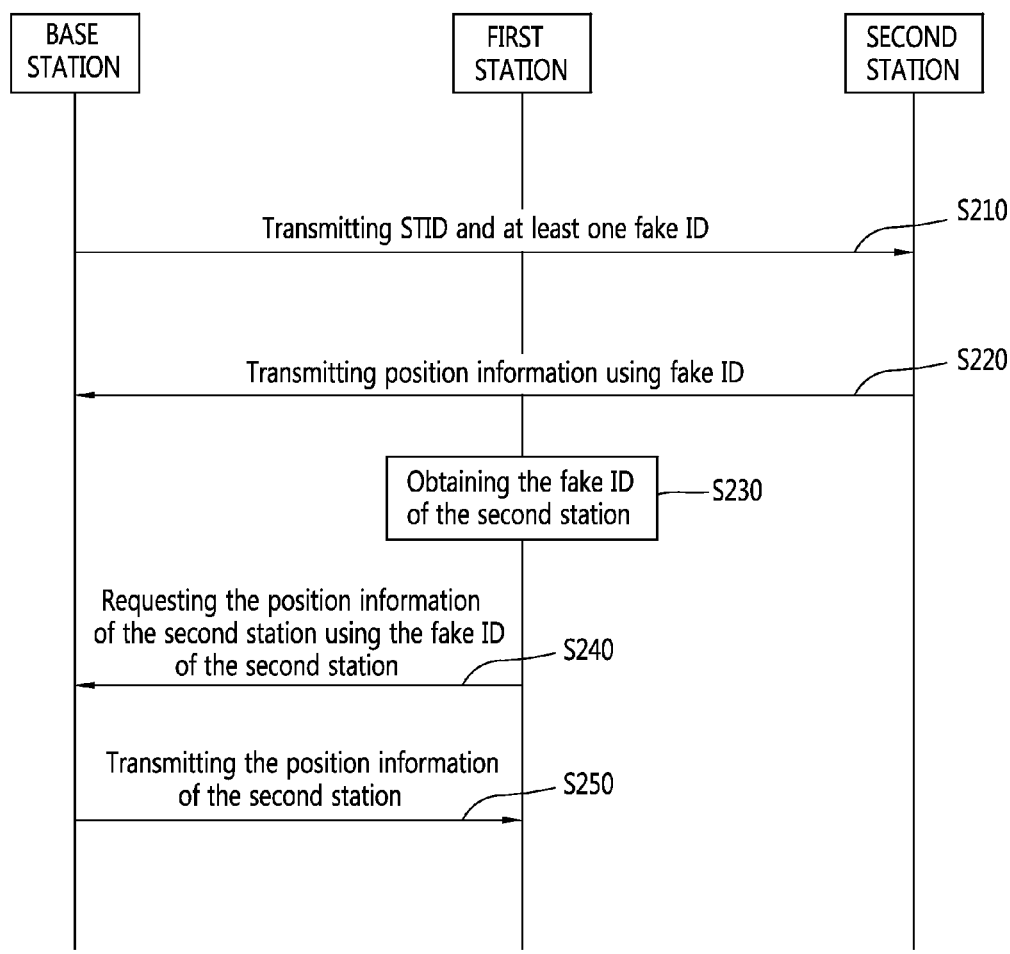
FIG. 2 is a flowchart that shows the method for measuring position according to the first embodiment of the present specification.

FIG. 2 is a flowchart that shows the method for measuring position according to the first embodiment of the present specification.

First, the base station allocates a station identifier (STID) or at least one fake ID to the first station and the second station, that is, to all stations by broadcast or unicast method (step, S210).

Here, the fake ID means an identifier used for measuring position (for example, the GPS information), which is mapped to the identifier which is peculiarly allocated to each mobile station.

Here, the base station stores a mapping table beforehand, which defines the mapping relation between the fake ID used for the position measurement and the identifier of the mobile station. In addition, the base station may update the stored mapping table upon necessity (a request of the mobile station or the change of the state (the number, the position, etc.) of the mobile station. This will be described in detail with reference to FIG. 4.

Table 1 below represents an example of the mapping table according to an embodiment of the present specification.

TABLE 1

| Mobile station 1 (D1) | Fake ID$_{(s)}$ of D1 | GPS information |
| Mobile station 2 (D2) | Fake ID$_{(s)}$ of D2 | GPS information |
| Mobile station 3 (D3) | Fake ID$_{(s)}$ of D3 | GPS information |
| Mobile station 4 (D4) | Fake ID$_{(s)}$ of D4 | GPS information |

Referring to table 1 above, at least one of the fake ID is mapped to each mobile station, and it can be seen that at least one of the fake ID is used for measuring the position information.

Later, the second station transmits the position information (for example, the GPS information) to the base station using the fake ID allocated from the base station (step, S220).

Here, in case that a specific event arises or an event arises at periodic intervals, the second station measures the position utilizing GPS, and transmits the position information measured to the base station.

Here, the position information of the second station may be transmitted to the base station periodically or when an event arises (a request of the mobile station or the base station).

Later, the first station obtains the fake ID of the second station (step, S230). Here, the process of obtaining the fake ID of the second station may be as follows.

That is, the first station overhears the transmission signal (transmission of the position information using the fake ID) of the second station. Through the process of overhearing, the first station may obtain the fake ID of the second station.

Also, in case that the transmission signal of the second station, which is overheard by the first station is plural, the first station selects the fake ID whose intensity is the biggest (for example, a mobile station which is nearest to the position of the first station) among the fake ID of the second station overheard.

As another example, the first station may obtain the fake ID of the second station through the exchange of signals (process of request and response) with the second station.

Later, the first station requests the position information of the second station to the base station using the obtained fake ID of the second station (step, S240).

Later, the base station transmits the position information of the second station to the first station in response to the request of the first station (step, S250).

Here, the base station extracts the position information that corresponds to the fake ID (the fake ID of the second station) and is received from the first station from the mapping table such as table 1. And, the base station transmits the extracted position information (the position information of the second station) to the first station.

The Second Embodiment

The second embodiment provides a method for determining the mobile station (cluster header: CH)) that directly performs the position measurement utilizing GPS, etc.

Figure 3:
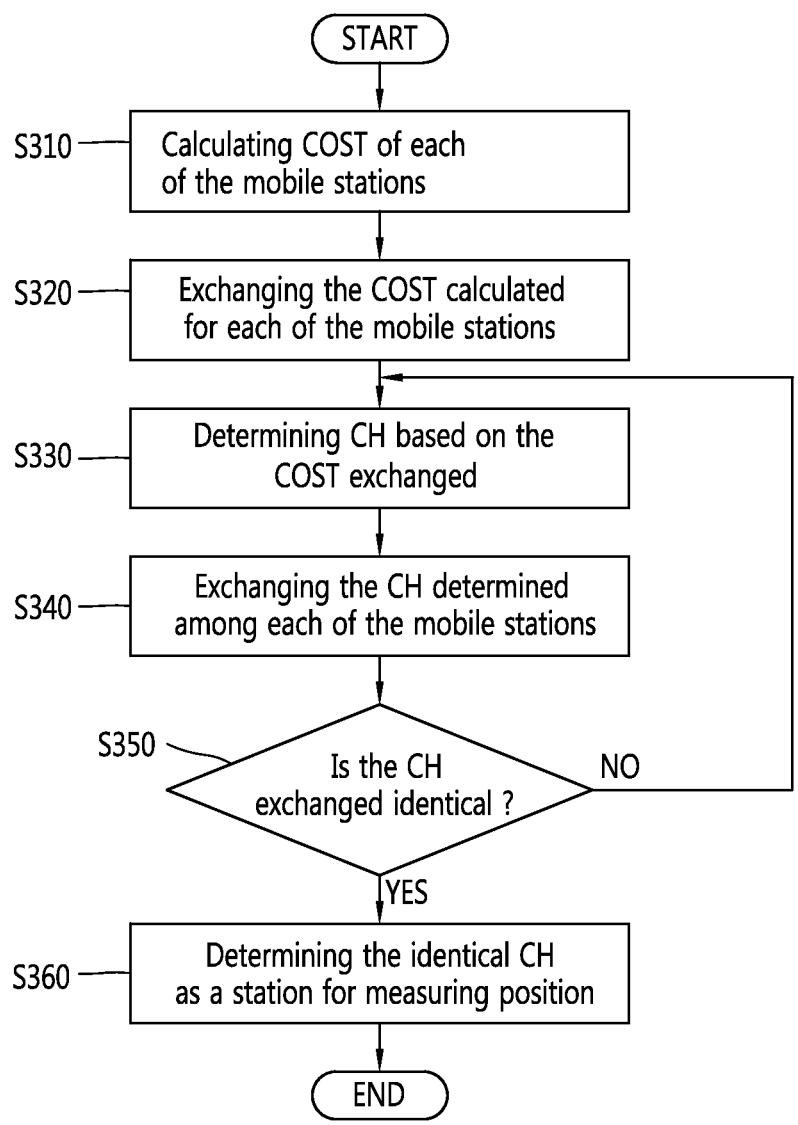
FIG. 3 is a flowchart that shows a method for determining a mobile station for measuring position according to the second embodiment of the present specification.

FIG. 3 is a flowchart that shows a method for determining a mobile station for measuring position according to the second embodiment of the present specification.

First, each of the mobile stations (the first station and the second station) which belong to one or more clusters calculates the cost (step, S310).

Here, each of the mobile stations calculates the cost according to Equation 1 below.

$$C_i(t) = d_i(t)\frac{w_i T_i(t)}{E_{r,i}(t)}, \text{ where } d_i(t) = \frac{1}{\sum_{j \neq i} RSSI_{ji}(t)^\alpha} \qquad \text{Equation 1}$$

Here, the $w_i T_i(t)$ is a factor for utilizing the energy of the mobile stations equitably, and $E_{r,i}(t)$ is a factor for maximizing the lifetime of the mobile station as long as possible. The $d_i(t)$ is a factor for decreasing the energy consumption as long as possible and increasing the accuracy of the position measurement. In particular, the $E_{r,i}(t)$ represents the remaining energy of the $i_{th}$ mobile station, and the $\{j \in J\}$ represents a set of the neighboring mobile stations. The $w_i$ represents the weight of the $i_{th}$ mobile station, and $T_i(t)$ represents the GPS position information of the $i+1_{th}$ mobile station. The $RSSI_{ji}$ represents the intensity of the signal which is received.

Later, each of the mobile stations exchanges the cost which is calculated at each mobile station using the SRC signaling (for example, the Bluetooth, etc.) (step, S320).

Later, each of the mobile stations determines the cluster header (CH) within the cluster to which it belongs, based on the cost exchanged (step, S330).

Later, each of the mobile stations exchanges the CHs determined (step, S340).

Later, it is determined whether the CHs exchanged among the mobile stations is the same or not. Here, determining whether the CHs are the same or not may be performed by the base station or each mobile station.

As a result of the determination, in case that the CHs exchanged among the mobile stations are not identical, each of the mobile station performs the steps from S330 to S350 repeatedly until the CHs exchanged become identical.

Later, in case the CHs exchanged among the mobile stations are identical as a result of the determination, the identical CHs are determined as the mobile station for measuring position using GPS (step, S360).

The Third Embodiment

The third embodiment provides a method for changing (or re-allocating) the fake ID.

Figure 4:
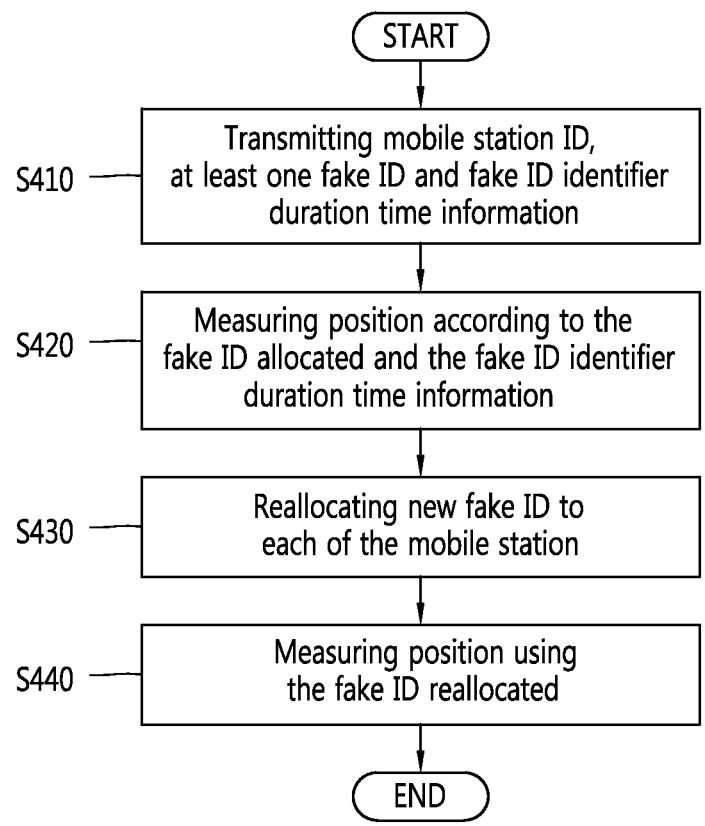
FIG. 4 is a flowchart that shows a method for changing or re-allocating the fake ID according to the third embodiment of the present specification.

FIG. 4 is a flowchart that shows a method for changing or re-allocating the fake ID according to the third embodiment of the present specification.

Referring to FIG. 4, the base station transmits a fake identifier (fake ID), one of the fake identifiers and the fake ID's duration time information that represents the effective use time of the station identifier (STID) using broadcast or unicast method to all mobile stations (step, S410).

Here, the fake ID duration time information refers to the information that represents the time for performing the position measurement of at least one fake ID through the cooperation of the mobile stations, which is allocated to each of the mobile stations by the base station.

Later, the mobile stations perform the process of measuring position based on the fake ID duration time information using the fake ID which is allocated by the base station (step, S420). That is, the mobile stations perform the steps from S210 to S250.

Later, if the effective use time of the fake ID allocated to each mobile station is terminated, the base station reallocates the changed (or reallocated, updated, or new) fake ID to the mobile stations (S430).

Here, the procedure of the step, S430 may reallocate a new fake ID to each of the mobile stations by updating the mapping table that stores the base station at every time previously defined (for example, periodically).

Also, if the base station is requested to reallocate the fake ID or the state of the mobile stations (the position of the mobile stations or the number of the mobile stations) is changed, the base station may reallocate a new fake ID to each of the mobile stations.

Later, each of the mobile stations performs the position measurement through cooperation, that is, performs the steps from S210 to S250 by using the fake ID reallocated by the base station (S440).

Table 2 and table 3 below represent the tables for analyzing GPS tracking by the mobile station. That is, table 2 and table 3 represent how many mobile station users are around a specific mobile station user within the radius of 10 meter on average and represent the average distance between one user and another user nearest to the user at a specific region (KAIST and NCSU) to show the effectiveness of the method suggested by the present specification.

TABLE 2

| KAIST | 90 users & 1000 m | 9000 users & 10 m |
|---|---|---|
| Average the number of users | 18.7 | 18.7 |
| Average minimum distance between users | 112 m | 1.2 m |

TABLE 3

| NCSU | 100 users & 3400 m | 34000 users & 10 m |
|---|---|---|
| Average the number of users | 17.3 | 17.3 |
| Average minimum distance between users | 1429 m | 4.2 m |

Referring to table 2 and table 3, by analyzing the traces in which each 90 and 100 students at KAIST (Korea Advanced Institute of Science and Technology) and NCSU (North Carolina State University) freely go around with GPS receiver for one week, it represents how many users are there around a specific mobile station user within the radius of 10 meter on average and the average distance between a specific user and the users who are located in the nearest with the specific user are shown at KAIST and NCSU.

As shown in table 2 and table 3 above, there exist 18.7 students in KAIST and 17.3 students in NCSU within the radius of 10 meters around a specific user. If only one user may measure position using GPS and share the information with the rest of the 17 or 18 people on the premise that the allowable margin of error is 10 meters, the effectiveness increases in the aspect of the power consumption of the mobile stations that belong to all of 18 persons.

Here, considering the ideal case that no power is used to share GPS information with neighboring users, the power consumed by the whole mobile stations may decrease in reverse proportion to the number of users as the number of users who shares GPS information increase.

Figure 5A:
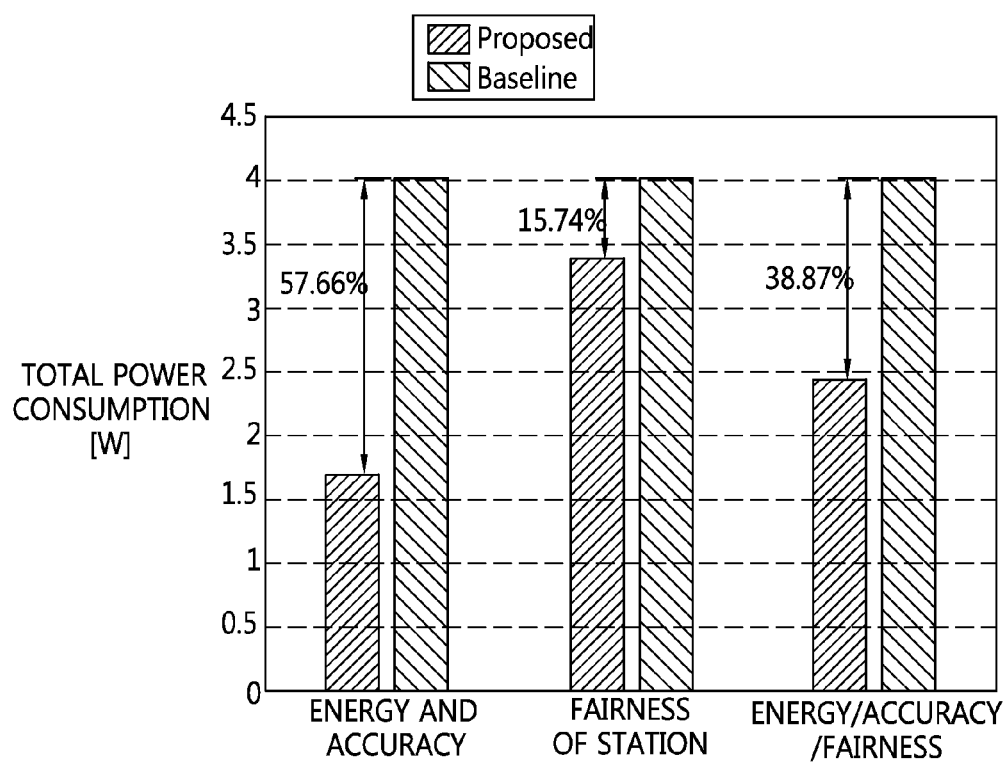
FIG. 5A and FIG. 5B are diagrams which illustrate the result of the total power consumption of the mobile station and the fairness in the aspect of energy consumption in case of utilizing the method for measuring position suggested by the present specification.
Figure 5B:
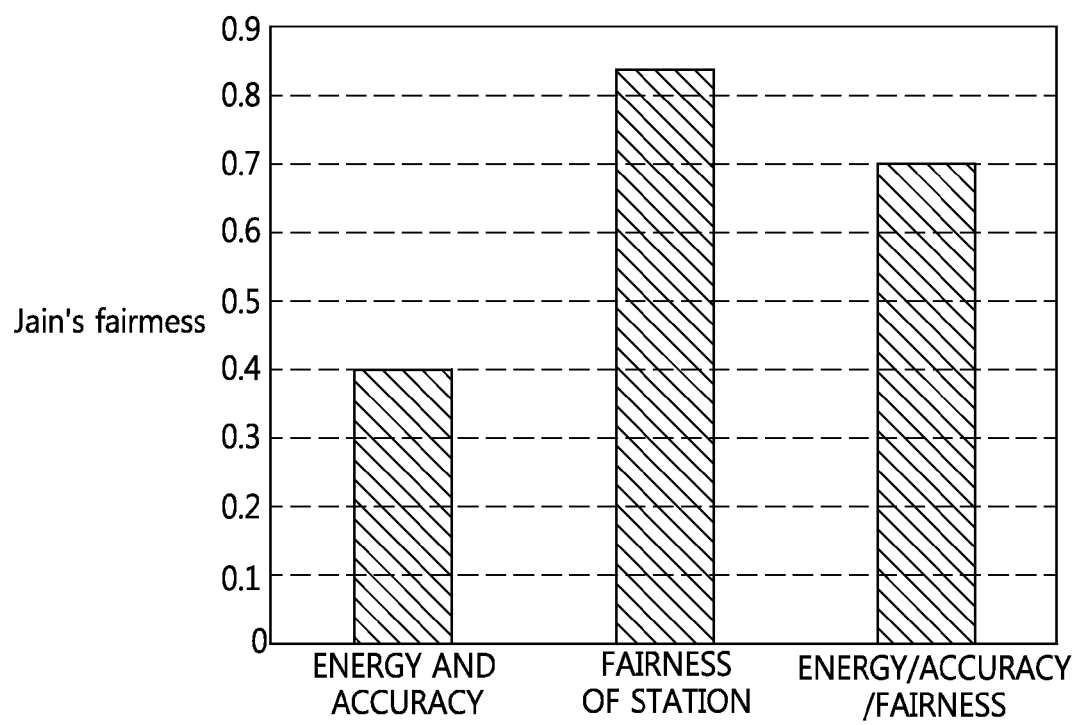

FIGS. 5A and 5B are diagrams which illustrate the result of the total power consumption of the mobile station and the fairness in the aspect of energy consumption in case of utilizing the method for measuring position suggested by the present specification.

That is, FIG. 5A illustrates the total power consumption, and FIG. 5B illustrates the fairness in the aspect of energy consumption, that is, Jain's fairness.

To obtain the result as illustrated in FIG. 5, it is assumed that 1) all mobile stations have the same energy remained, 2) the tracking of the mobile station as represented in table 2 above is used, and 3) all mobile stations use GPS as the baseline performance.

As shown in FIG. 5, in case of using the position measurement method as suggested by the present specification, it may be found that the total power consumption is decreased (57.66%, 15.74%, 38.87%) compared to the standard model (that is, all the mobile stations measure position utilizing GPS) in cases of measuring energy and accuracy, measuring only fairness of mobile station, and measuring all of the energy/accuracy/fairness.

The embodiment and their modification as described above may be combined. Accordingly, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 6.

Figure 6:
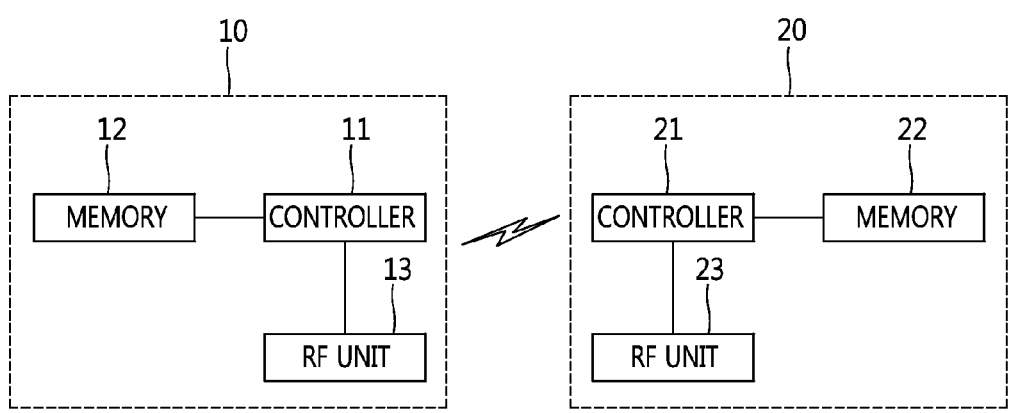
FIG. 6 is a block diagram showing internal structures of a mobile station and a base station in a wireless access system according to an embodiment of the present specification.

FIG. 6 is a block diagram showing internal structures of a mobile station and a base station in a wireless access system according to an embodiment of the present specification.

A mobile station 10 includes a controller (processor) 11, a memory 12, and a radio frequency (RF) unit 13.

Further, the mobile station also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the mobile station, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A base station 20 includes a controller (processor) 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit as a processor. The memories 12 and 22 may include a read-only memory (ROM), a random access memory (RAM), a flash memory, a memory card, storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

What is claimed is:

1. A method for receiving position information performed by a first station using a second station positioned in the vicinity of the first station in a wireless access system, the method comprising:
receiving a station identifier (STID) and at least one fake ID from a base station;
obtaining a fake ID of the second station;
requesting the position information on the second station to the base station using the obtained fake ID of the second station;
receiving the position information of the second station from the base station,
wherein the fake ID of the second station is an identifier used for measuring the position, and is mapped to the STID;
measuring the position information by performing:
calculating a cost performed by each of the first and second stations which belong to at least one of a plurality of clusters;
exchanging the cost among the first and second stations, which is calculated by each of the first and second stations using a Bluetooth communication, and
determining a cluster head (CH) by each of the first and second stations based on the cost exchanged among the first and second stations,
wherein the cost is calculated by a specific equation using a first parameter related to an energy use of the first and second stations equitably, a second parameter related to a maximum lifetime of the first and second stations, a third parameter related to a decreasing of an energy consumption and an increasing of accuracy of the measured position information.

2. The method of claim 1, wherein obtaining the fake ID of the second station comprises:
overhearing a transmission signal of the second station;
measuring a strength of the transmission signal overheard; and
selecting a transmission signal whose intensity measured is the biggest among the second stations.

3. The method of claim 2, wherein the signal transmitted by the second station is a fake ID.

4. The method of claim 1, further comprising:
transmitting the position information to the base station, which is measured by the second station using the fake ID allocated from the base station.

5. The method of claim 4, wherein the measuring the position information further comprises:
exchanging the CH among the first and second stations, which is determined by each of the first and second stations, which is performed by each of the first and second stations; and
if the CHs exchanged among the first and second stations are identical, determining the identical CH to be a station to measure position using GPS.

6. The method of claim 5, wherein the cost is calculated by the following equation, $$C_i(t) = d_i(t) \frac{w_i T_i(t)}{E_{r,i}(t)}, \text{ where } d_i(t) = \frac{1}{\sum_{j \neq i} RSSI_{ji}(t)^\alpha}.$$

7. The method of claim 1, further comprising:
receiving control information that represents effective use time of a fake ID which is allocated to each of the first and second stations in order to measure the position from the base station.

8. The method of claim 7, further comprising:
if the effective use time is terminated, receiving reallocation of a fake ID from the base station.

9. A method for measuring position through cooperation between a first station and a second station positioned in the vicinity of the first station in a wireless access system, the method comprising:
transmitting a station identifier (STID) and at least one fake ID to the first station and the second station performed by a base station;
receiving position information of the first station from the first station through the fake ID allocated to the first station performed by the base station;
receiving a message of requesting the position information of the first station from the second station through the fake ID allocated to the first station performed by the base station; and
transmitting the position information of the first station to the second station performed by the base station,
wherein the fake ID is an identifier used for measuring position, and is mapped to the STID,
wherein the position information is measured by calculating a cost performed by each of the first and second stations which belong to at least one of a plurality of clusters, exchanging the cost among the first and second stations, which is calculated by each of the first and second stations using a Bluetooth communication, and determining a cluster head (CH) by each of the first and second stations based on the cost exchanged among the first and second stations, wherein the cost is calculated by a specific equation using a first parameter related to an energy use of the first and second stations equitably, a second parameter related to a maximum lifetime of the first and second stations, a third parameter related to a decreasing of an energy consumption and an increasing of accuracy of the measured position information.

10. The method of claim 9, further comprising:
extracting the position information of the first station from the fake ID allocated to the first station transmitted through the second station using a mapping table previously stored, which is performed by the base station.

11. A terminal for measuring position information using neighboring station in a wireless access system, the terminal comprising:
a radio frequency (RF) unit transmitting or receiving a radio signal, and
a processor operatively coupled to the RF unit, wherein the processor is configured for:
controlling the RF unit in order to obtain a fake ID of the neighboring station, controlling to request the position information of the neighboring station to a base station using the fake ID obtained, and controlling to receive the position information of the neighboring station from the base station, and measuring the position information by performing calculating a cost performed by each of the stations which belong to at least one of clusters; exchanging the cost one another, which is calculated by each of the stations using a Bluetooth communication, and determining a cluster head (CH) by each of the stations based on the cost exchanged among the stations, wherein the fake ID is an identifier used for measuring position, wherein the fake ID is allocated to each of the stations by at least one performed by the station, and wherein the fake ID is mapped to a station identifier (STID), wherein the cost is calculated by a specific equation using a first parameter related to an energy use of the first and second stations equitably, a second parameter related to a maximum lifetime of the first and second stations, a third parameter related to a decreasing of an energy consumption and an increasing of accuracy of the measured position information.

12. The terminal of claim 11, wherein the processor is configured for:
controlling the RF unit in order to receive control information that represents a use time of the fake ID which is allocated to each of the mobile stations performed by the base station.

* * * * *